(12) United States Patent
Fukuyama (10) Patent No.: US 6,366,833 B1
(45) Date of Patent: Apr. 2, 2002

(54) YAW RATE ESTIMATING APPARATUS

(75) Inventor: Kensuke Fukuyama, Tokyo (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/526,130

(22) Filed: Mar. 15, 2000

(30) Foreign Application Priority Data

Mar. 26, 1999 (JP) ............................................ 11-084319

(51) Int. Cl.$^7$ ................................................ G06F 7/00
(52) U.S. Cl. .............................................. 701/1; 701/72
(58) Field of Search .............................. 701/1, 29, 31, 701/36, 41, 70, 72, 74

(56) References Cited

U.S. PATENT DOCUMENTS

| | | | | |
|---|---|---|---|---|
| 5,369,580 A | * | 11/1994 | Monji et al. .................... | 701/1 |
| 5,446,658 A | * | 8/1995 | Pastor et al. .................... | 701/1 |
| 5,809,434 A | * | 9/1998 | Ashrafi et al. .................. | 701/1 |
| 5,973,463 A | * | 10/1999 | Okuda et al. .................. | 701/4 |

FOREIGN PATENT DOCUMENTS

| | | |
|---|---|---|
| JP | 10-44960 A | 2/1998 |
| JP | 10-175528 A | 6/1998 |
| JP | 11-51668 A | 2/1999 |

* cited by examiner

*Primary Examiner*—Tan Nguyen
*Assistant Examiner*—Edward Pipala
(74) *Attorney, Agent, or Firm*—Shinjyu Global IP Counselors, LLP (57) ABSTRACT

A yaw rate estimating apparatus is provided to estimate a yaw rate more accurately even if a vehicle is in a turn. A gain correction k for precluding an error in an estimated yaw rate due to tire deformation during a turn is predetermined for a lateral acceleration based on corresponding vehicle data. The gain correction k is provided in a gain correction characteristic map, in which the gain correction k is set to decrease as the lateral acceleration increases. The corresponding gain correction k is obtained from the gain correction characteristic map based on the detected lateral acceleration $Y_G$ while the vehicle is in a non-controlled state. The estimated yaw rate is obtained by multiplying a yaw rate, which is estimated based on a wheel speed difference between left and right non-driving wheels and a tread, by the gain correction.

23 Claims, 6 Drawing Sheets

YAW RATE ESTIMATING APPARATUS

BACKGROUND OF THE INVENTION

1. Field of the Invention

The present invention relates to a yaw rate estimating apparatus for estimating a yaw rate of a vehicle based on a difference in wheel speed between left and right wheels.

2. Background Information

There has been known a yaw rate estimating apparatus that estimates a yaw rate based on a difference in wheel speed between left and right wheels, which occurs when the vehicle is making a turn and the left and right wheels move following different trajectories. Such yaw rate estimating apparatus for a vehicle is disclosed in the Japanese unexamined Patent Publication No. 10-175528.

SUMMARY OF THE INVENTION

It has been conceived that such estimated yaw rate can be used for detecting malfunction of a yaw rate sensor by comparing the estimated yaw rate with a detected yaw rate of the yaw rate sensor. In such case, it is desirable to estimate the yaw rate while the left and right wheels are in non-controlled state in order to assure the accuracy of the estimated yaw rate. However, the load of the vehicle tends to move outward while the vehicle is making a turn. Consequently, a tire diameter of the outer wheel, which is located radially farther from the center of rotation of the vehicle, becomes smaller, while a tire diameter of the inner wheel becomes greater. Therefore, if the yaw rate is estimated without taking such effect into consideration, the estimated yaw rate will become greater than the actual yaw rate, since an additional wheel speed difference induced by the tire diameter difference is added to the wheel speed difference due to the difference in trajectories.

In view of the above, there exists a need for a yaw rate estimating apparatus which overcomes the above mentioned problems in the prior art. This invention addresses this need in the prior art as well as other needs, which will become apparent to those skilled in the art from this disclosure.

Accordingly, one object of the present invention is to provide a yaw rate estimating apparatus capable of estimating the yaw rates more accurately.

Another object of the present invention is to provide a yaw rate estimating apparatus which estimates the yaw rate based on the wheel speed difference between the detected left and right wheel speeds, and which is corrected based on the lateral acceleration, so that an error in the estimated yaw rate due to the tire deformation during a turn can be advantageously precluded. As a result, the more accurate estimated yaw rate can be obtained.

To achieve the objects of the present invention, a yaw rate estimating apparatus is provided for a vehicle having a right wheel and a left wheel. The yaw rate estimating apparatus comprises a right wheel speed sensor, a left wheel speed sensor, a vehicle status detector, a lateral acceleration device and a control unit. The right wheel speed sensor detects a right wheel speed of the right wheel and generates a right wheel speed signal. The left wheel speed sensor detects a left wheel speed of the left wheel and generates a left wheel speed signal. The vehicle status detector indicates a current state of a selected parameter of the vehicle. The lateral acceleration device determines a lateral acceleration of the vehicle and generates a lateral acceleration signal. The control unit is operatively coupled to the vehicle status indicator and the right and left wheel speed sensors to initially estimate a yaw rate of the vehicle based on a difference between the right wheel speed and the left wheel speed from the right and left wheel speed signals in response to the control unit determining the vehicle is a non-controlled state from the vehicle status indicator. The control unit corrects the estimate of the yaw rate based on the lateral acceleration signal to determine and output an estimated yaw rate.

The forgoing objects of the present invention can also be attained by providing a yaw rate estimating apparatus for a vehicle having a right wheel and a left wheel, the yaw rate estimating apparatus comprising a right wheel speed detecting means for detecting a right wheel speed of the right wheel; left wheel speed detecting means for detecting a left wheel speed of the left wheel; non-controlled state detecting means for detecting whether the vehicle is in a non-controlled state; lateral acceleration obtaining means for obtaining a lateral acceleration generated on the vehicle; yaw rate estimating means for computing an estimated yaw rate of the vehicle based on a difference between the right wheel speed and the left wheel speed if the vehicle is in the non-controlled state; and correcting means for correcting the estimated yaw rate based on the lateral acceleration to output a corrected estimated yaw rate.

The forgoing objects of the present invention can also be attained by providing a method of estimating a yaw rate of a vehicle having a right wheel and a left wheel, the method comprising providing a right wheel speed sensor and a left wheel speed sensor; determining whether the vehicle is in a non-controlled state; detecting a right wheel speed of the right wheel through the right wheel speed sensor; detecting a left wheel speed of the left wheel through the a left wheel speed sensor; obtaining a lateral acceleration of the vehicle; computing an initial estimation of a yaw rate of the vehicle based on a difference between the right wheel speed and the left wheel speed if the vehicle is in the non-controlled state; and correcting the initial estimation of the yaw rate based on the lateral acceleration to determine an estimated yaw rate.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings that form a part of this original disclosure.

DETAILED DESCRIPTION OF THE PREFERRED EMBODIMENTS

Figure 1:
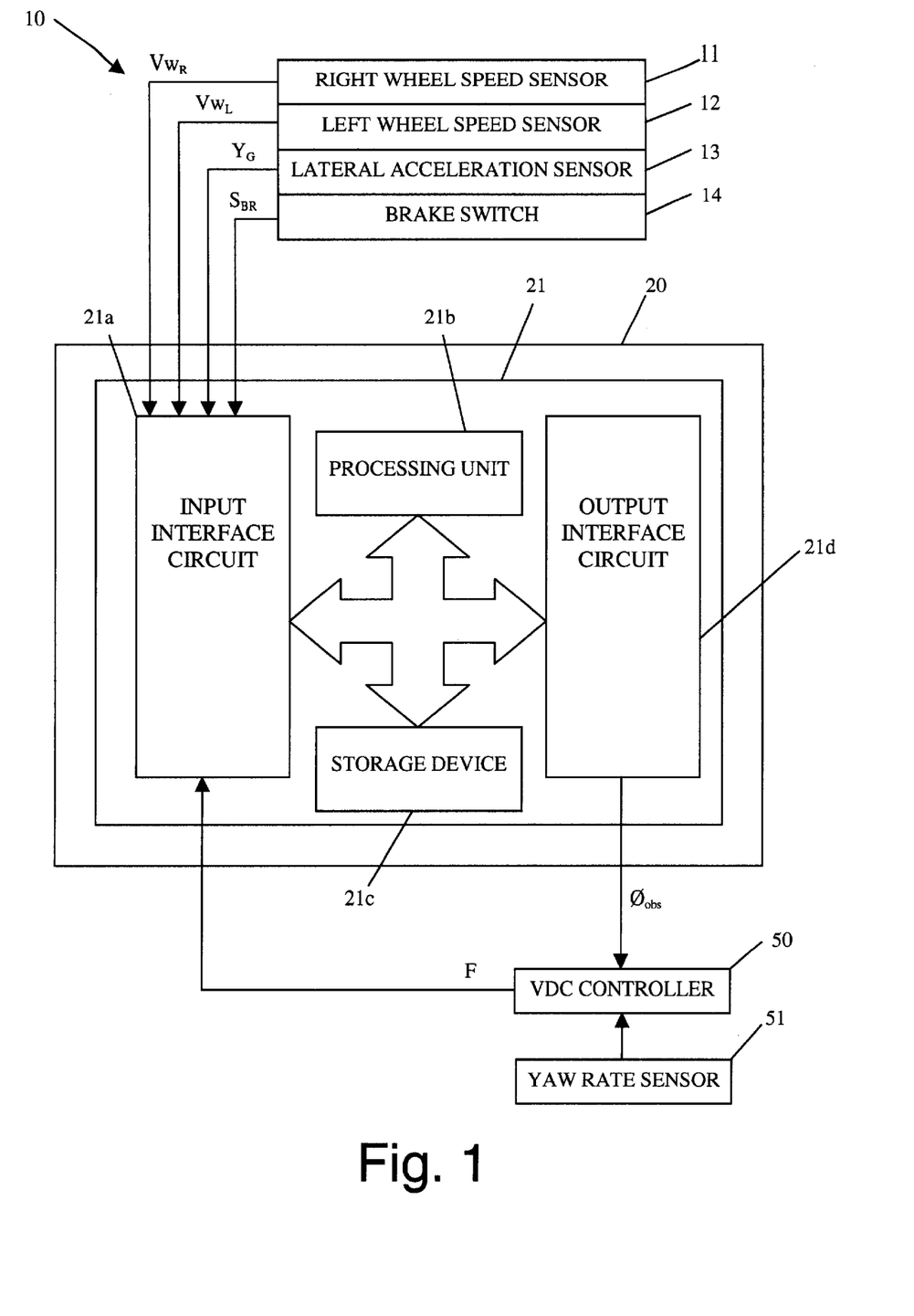
FIG. 1 is a schematic structural diagram of a yaw rate estimating apparatus and adjacent structures in accordance with a first embodiment of the present invention.

A first embodiment of the present invention will now be described in conjunction with the accompanying FIGS. 1–4. FIG. 1 is a schematic structural diagram of a yaw rate estimating apparatus 10 in accordance with the present invention. The yaw rate estimating apparatus 10 basically includes a right wheel speed sensor 11, a left wheel speed sensor 12, a lateral acceleration sensor 13, a brake switch 14 and a control unit 20 with a microcomputer 21. The yaw rate estimating apparatus 10 is installed on a vehicle 23.

Figure 4:
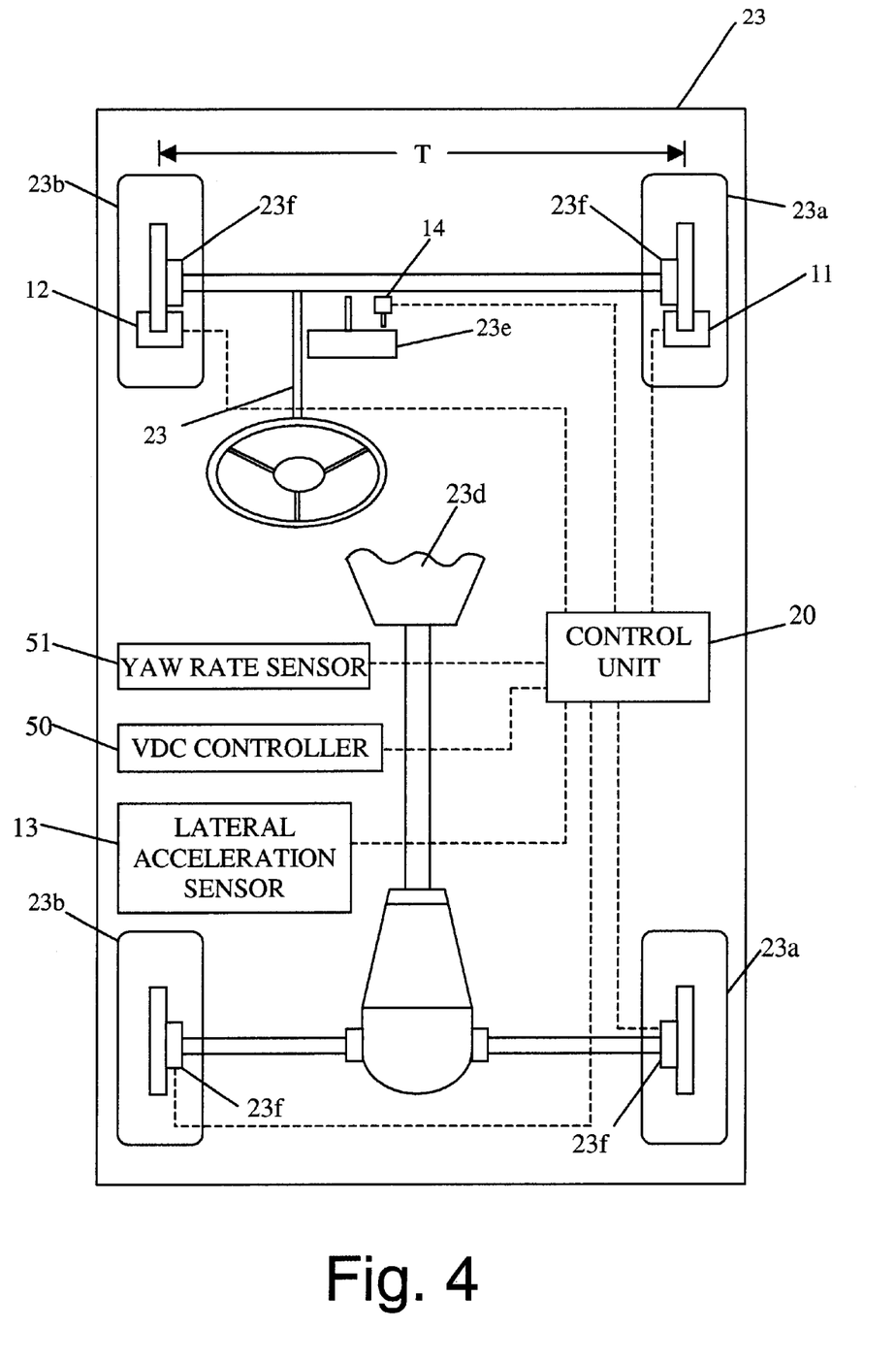
FIG. 4 is a schematic diagram of a vehicle with the yaw rate estimating apparatus in accordance with the first embodiment of the present invention.

The vehicle 23 can be any type of vehicle in which it is desirable to control the behavior of the vehicle based on its yaw rate. The various components of the vehicles are well known in the art, and thus, only selected parts of the vehicle 23 will be discussed herein. As seen in FIG. 4, the vehicle 23 is illustrated as a schematic diagram. While the illustrated vehicle 23 is a rear wheel drive, the present invention can also be applied to other types of vehicles. The illustrated vehicle 23 has a pair of right wheels 23a, a pair of left wheels 23b, a steering mechanism 23c, a transmission 23d and a brake pedal 23e for actuating brakes 23f.

The sensors 11, 12 and 13 are conventional sensors that are well known in the art. Therefore, the sensors 11, 12 and 13 will not be discussed or illustrated in detail herein. Moreover, it will be apparent to those skilled in the art from this disclosure that these sensors 11, 12 and 13 can be any type of sensor that will detect and generate the necessary signal to carryout the present invention.

Likewise, the brake switch 14 is also a conventional device that is well known in the art. Thus, the brake switch 14 will also not be discussed or illustrated in detail herein. Moreover, the brake switch 14 can be substituted with other types of switches or sensors that will indicate the current braking status to the control unit 20. When the brake pedal 23e is depressed, the brake switch 14 sends to the control unit 20 a brake signal $S_{BR}$. When the brake pedal 23e is released, the brake switch 14 indicates to the control unit 20 that the vehicle is in a non-braking state. The control unit 20 normally only receives a signal $S_{BR}$ from the brake switch 14 when the brake pedal 23e is depressed. Of course, it will be apparent to those skilled in the art from this disclosure that the control unit 20 can receive a signal from the brake switch 14 when the brake pedal 23e is released.

The right wheel speed sensor 11 is provided on a right non-driving wheel for detecting a rotating speed of the right non-driving wheel. The left wheel speed sensor 12 is provided on a left non-driving wheel for detecting a rotating speed of the left non-driving wheel. The right and left wheel speed sensors 11 and 12 can be, for example, an electromagnetic type or pick-up coil type sensors that operate on a pulse-counter principle. For example, the right and left wheel speed sensors 11 and 12 monitor the rotation of the right and left wheels, respectively. The speed sensors 11 and 12 produce a magnetic field during the rotation of the wheels, which in turn creates a small voltage that is detected by the sensor. The strength of this voltage varies in relation to the speed of wheel rotation.

The lateral acceleration sensor 13 detects a lateral acceleration generated on the vehicle. The lateral acceleration sensor 13 can be any conventional type of lateral acceleration sensor. One example of a lateral acceleration sensor that may be used in accordance with the present invention is an acceleration sensor, such as a cantilever type strain gauge. Of course, other types of sensors can be utilized to carry out the present invention.

The brake switch 14 detects whether a brake pedal 23e is depressed. When the brake pedal 23e is released, the vehicle 23 is in the non-braking (non-controlled) state. When the brake pedal 23e is depressed, the vehicle 23 is in the braking (controlled) state. In other words, the brake switch 14 detects whether the vehicle is in a braking (controlled) state or a non-braking (non-controlled) state. As discussed below, when the vehicle is in a non-braking (non-controlled) state, the yaw rate estimating apparatus 10 operates to estimate the yaw rate of the vehicle. On the other hand, if the vehicle is in a braking (controlled) state, as determined by the brake switch 14, then the yaw rate estimating apparatus 10 will not perform the function of estimating the yaw rate of the vehicle. The brake switch 14 can be any conventional type of switch. One example of a brake switch that can be used in connection with the above-identified invention is a pressure activated type switch, such as disclosed in Japanese Unexamined Patent Publication No. 8-26102 that was published on Jan. 30, 1996. Of course, other types of sensing devices can be utilized for the brake switch 14, as needed and/or desired.

The control unit 20 computes an estimated yaw rate based on signals sent from the aforementioned sensors 11–14. The control unit 20 outputs the estimated yaw rate $\emptyset_{obs}$ to a VDC (Vehicle Dynamics Control) controller 50 that controls behavior of the vehicle 23. The control unit 20 also receives from the VDC controller 50 a VDC activation flag F, details of which will be described later.

As in known vehicle behavior control devices, the VDC controller 50 computes a yaw moment for stabilizing the behavior of the vehicle 23 based on signals that various sensors such as a yaw rate sensor 51 detected. The yaw rate sensor 51 is well known in the art, and thus, will not be discussed or illustrated in detail herein. One example of a yaw rate sensor that can be used in the present invention is a swing gyro sensor.

The VDC controller 50 then further computes by how much brake pressure of each brake 23f needs to be increased or decreased such that the computed yaw moment is added to the current vehicle behavior. Accordingly, the VDC controller 50 increases or decreases the wheel cylinder pressure of corresponding inner or outer wheel by a predetermined amount based on the computed required change in the wheel cylinder pressure. While the VDC controller 50 controls the cylinder pressure of the wheel cylinder, the VDC controller 50 sets the VDC activation flag F to 1 (F=1) and sends this VDC activation flag F to the control unit 20.

As seen in FIG. 1, the control unit 20 includes a microcomputer 21. The microcomputer 21 includes an input interface circuit 21a, a processing unit 21b such as a microprocessor, a storage device 21c such as a ROM (Read Only Memory) device and a RAM (Random Access Memory) device and an output interface circuit 21d. The input interface circuit 21a has waveform shaping function, F/V (Frequency to Voltage) converting function, and/or A/D (Analog to Digital) converting function for reading the detected signals sent from each of the aforementioned sensors. The output interface circuit 21d outputs the estimated yaw rate $\emptyset_{obs}$ computed at the processing unit 21b.

The storage device 21c stores a program for executing a yaw rate estimating process, details of which will be described later. The storage device 21c also stores a gain correction characteristic map used in the yaw rate estimating process. The processing unit 21b executes the yaw rate estimating process. While the vehicle 23 is in the non-controlled state, a gain correction k that corresponds to a lateral acceleration $Y_G$ detected by the lateral acceleration sensor 13 is obtained from the gain correction characteristic map stored in the storage device 21c. The estimated yaw rate $\emptyset_{obs}$ is computed based on the gain correction k, the right wheel speed $Vw_R$ detected by the right wheel speed sensor 11 and the left wheel speed $Vw_L$ detected by the left wheel speed sensor 12.

In the yaw rate estimating apparatus 10, the correction amount for the estimated yaw rate is learned based on the moving state of the vehicle 23, so that the estimated yaw rate is advantageously corrected based on the current state of the vehicle 23. As a result, the yaw rate can be estimated more accurately.

Figure 2:
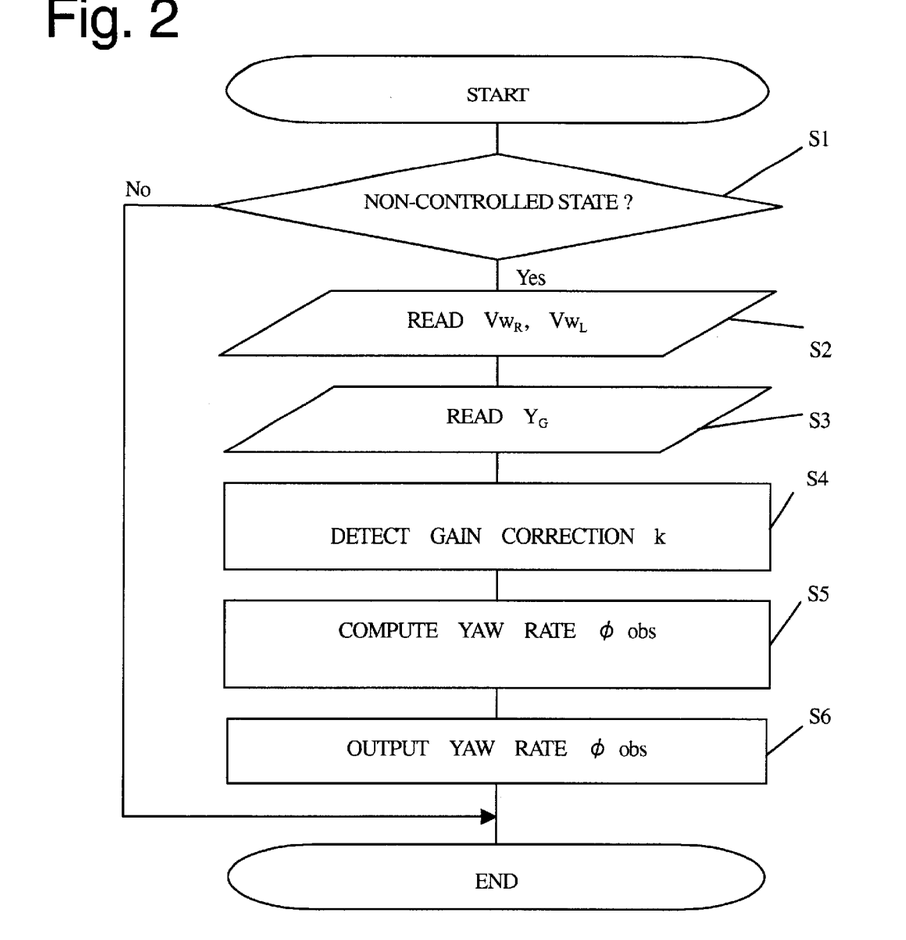
FIG. 2 is a flow chart of an operation of the yaw rate estimating apparatus in accordance with the first embodiment of the present invention.

FIG. 2 is a flow chart of a yaw rate estimating process. The yaw rate estimating process is executed whenever a timer interruption occurs, for example, at every predetermined period of time, e.g., every twenty milliseconds.

In this yaw rate estimating process, the control unit 20 first determines at step S1 whether the vehicle 23 is in the non-controlled state or the controlled state based on a state signal $S_{BR}$ and the VDC activation flag F. The state signal $S_{BR}$ is sent from the brake switch 14 to the control unit 20 and indicates an operational state of a brake. The VDC activation flag F is sent from the VDC controller 50. The controlled state occurs when the vehicle is in a braking state and/or when the activation flag is equal to 1 (F=1). Otherwise, the vehicle 23 is in the non-controlled state. If the vehicle 23 is in the controlled state, the process is terminated.

On the other hand, if the vehicle 23 is in the non-controlled state, the control unit 20 proceeds to step S2, where it reads the detected wheel speeds $Vw_R$ and $Vw_L$ from the right and left wheel speed sensors 11 and 12. The control unit 20 then proceeds to step S3, where it reads the detected lateral acceleration $Y_G$ from the lateral acceleration sensor 13. Thereafter, the control unit 20 proceeds to S4, where it obtains the gain correction k that corresponds to the detected lateral acceleration $Y_G$ from the gain correction characteristic map stored in the storage device 21c. In other words, the yaw rate estimating apparatus 10 first estimates the yaw rate based on the wheel speed difference between the detected left and right wheel speeds $Vw_R$ and $Vw_L$. Then, the yaw rate estimating apparatus 10 corrects the estimation of the yaw rate based on the lateral acceleration $Y_G$, so that an error in the estimated yaw rate due to the tire deformation during a turn can be advantageously precluded. As a result, the more accurate estimated yaw rate can be obtained.

Figure 3:
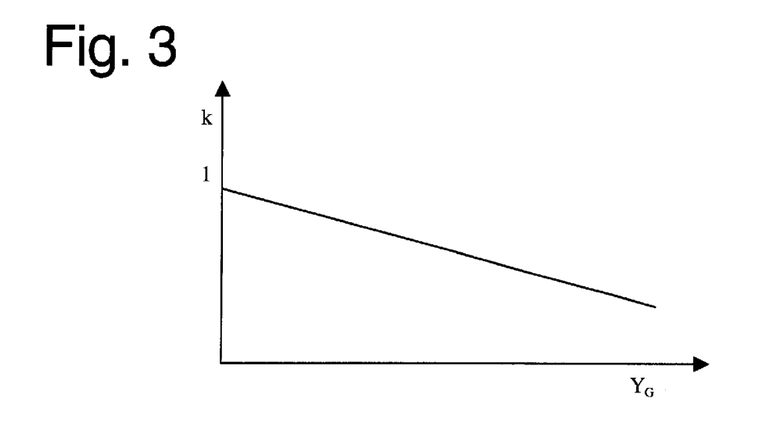
FIG. 3 is an example of gain correction characteristic map for use in a yaw rate estimating apparatus in accordance with selected embodiments of the present invention.

The gain correction characteristic map sets forth gain correction k against the lateral acceleration $Y_G$. The gain correction characteristic map is pre-configured for each vehicle 23 in advance and stored in the storage device 21c. The gain correction k obtained from this map is used for correcting an error in the estimated yaw rate $\emptyset_{obs}$ that occurs due to an error in the detected wheel speeds $Vw_R$ and $Vw_L$ induced by deformation of the tire during the turn. As seen in FIG. 3, an example of the gain correction characteristic map is illustrated in accordance with the present invention. As seen therein, the gain correction k decreases as the lateral acceleration $Y_G$ increases.

Once the gain correction k is detected in step S4, the control unit 20 proceeds to step S5, where the estimated yaw rate $\emptyset_{obs}$ is computed based on following equation (1):

$$\emptyset_{obs}=k\times(Vw_R-Vw_L)/T \qquad (1)$$

where T is a tread of the vehicle 23, which is a distance between the center of the tires of two opposing non-driven wheels at points where they contact the ground.

Then, control unit 20 proceeds to step S6, where the estimated yaw rate $\emptyset_{obs}$ is outputted to the VDC controller 50.

In this embodiment, the right wheel speed sensor 11 corresponds to the right wheel speed detecting means, while the left wheel speed sensor 12 corresponds to the left wheel speed detecting means. The lateral acceleration sensor 13 corresponds to the lateral acceleration detecting means. Furthermore, the step S1 in FIG. 2 form a vehicle status detector that corresponds to the non-controlled state detecting means, while the steps S4 and S5 correspond to the yaw rate estimating means and the correcting means, respectively.

Detailed operations of the yaw rate estimating apparatus 10 in accordance with the first embodiment will now be described. In the control unit 20, the yaw rate estimating process of FIG. 2 is executed at every predetermined period of time. For example, the yaw rate estimating process occurs every twenty milliseconds. The yaw rate estimating process first determines whether the vehicle 23 is in the non-controlled state or controlled state based on the state signal $S_{BR}$ and the VDC activation flag F. In other words, a part of the program of yaw rate estimating process acts as a vehicle status detector for determining whether the vehicle 23 is in the non-controlled state or controlled state. The state signal $S_{BR}$ is sent from the brake switch 14, while the signal of the VDC activation flag F (F=0 or F=1) is sent from the VDC controller 50. If the VDC activation flag F equals zero (F=0) and the brake switch 14 is in the released state, then the vehicle 23 is determined to be in the non-controlled state.

For example, the vehicle 23 is moving in straight line or steadily around a curve with the brake switch 14 in the released state, then the vehicle 23 is determined to be in the non-controlled state. Therefore, the processing unit 21b proceeds from step S1 to step S2, where it reads the wheel speeds $Vw_R$ and $Vw_L$ detected by the right and left wheel speed sensors 11 and 12. Thereafter, the processing unit 21b reads the detected lateral acceleration $Y_G$ from the lateral acceleration sensor 13 at step S3.

Based on the detected lateral acceleration $Y_G$, the corresponding gain correction k is obtained from the gain correction characteristic map shown in FIG. 3. Then, the estimated yaw rate $\emptyset_{obs}$ is computed based on the equation (1) using the gain correction k, the detected wheel speeds $Vw_R$ and $Vw_L$ and the tread T of the vehicle 23. In the case where the vehicle 23 is moving in straight line, the detected lateral acceleration $Y_G$ should be relatively small. Therefore, the corresponding gain correction k will be set as a value close to 1. Accordingly, the estimated yaw rate $\emptyset_{obs}$ will be dependent on a wheel speed difference $\Delta Vw$ (=$Vw_R$-$Vw_L$) between the right and left wheels 11 and 12 and the tread T.

Then, the control unit 20 outputs the estimated yaw rate $\emptyset_{obs}$ to the VDC controller 50. The VDC controller 50 compares this estimated yaw rate $\emptyset_{obs}$ with the detected signal of the yaw rate sensor 51 to monitor malfunctioning of the yaw rate sensor 51.

Once the vehicle 23 initiates a turn, the detected lateral acceleration $Y_G$ increases. Accordingly, the detected gain correction k decreases. The gain correction k corrects an increase in the wheel speed difference $\Delta Vw$ that results from an increase in tire deformation of the outer tire at the time of turning. Therefore, the estimated yaw rate $\emptyset_{obs}$ can be computed without being affected by the tire deformation. The gain correction k is configured to decrease as the detected lateral acceleration $Y_G$ increases. In other words, as the error in the wheel speed difference $\Delta Vw$ increases due to an increase in tire deformation, the gain correction k makes greater correction. Accordingly, the gain correction k corrects by an amount that corresponds to the amount of the tire deformation. The control unit 20 continues to compute the estimated yaw rate $\emptyset_{obs}$ during the turning of the vehicle 23, until the vehicle 23 enters the controlled state, e.g. the brakes are applied or the wheel cylinder pressure is being adjusted. Once the vehicle 23 enters the non-controlled state e.g. the brakes are released and the wheel cylinder pressure is no longer being adjusted, the control unit 20 again continuously computes the estimated yaw rate $\emptyset_{obs}$ every predetermined period of time.

When the control unit 20 determines the behavior of the vehicle 23 needs to be stabilized, the VDC controller 50 computes the yaw moment for stabilizing the behavior of the vehicle 23. Thereafter, VDC controller 50 increases and/or decreases the pressure of the wheel cylinder of the outer or inner wheel such that the computed yaw moment is added to the current behavior of the vehicle 23. During this adjustment period, the VDC controller 50 sets the VDC activation flag F to 1 (F=1) and outputs this activation flag F to the control unit 20. Once the control unit 20 receives the activation flag F from the VDC controller 50, the control unit 20 determines at step S1 that the vehicle 23 is in the controlled state. Accordingly, the yaw rate estimating process is terminated without conducting the estimation of the yaw rate. Since the VDC controller 50 does not receive the estimated yaw rate $\emptyset_{obs}$ from the control unit 20, the malfunctioning monitoring of the yaw rate sensor 51 does not take place. In other words, while the vehicle 23 is in the controlled state, the accuracy of the estimated yaw rate $\emptyset_{obs}$ which is estimated based on the wheel speed difference $\Delta Vw$, is relatively low. Therefore, VDC controller 50 does not conduct the malfunctioning monitoring based on this inaccurate estimated yaw rate $\emptyset_{obs}$.

Furthermore, when a driver of the vehicle 23 applies the brakes 23f by pressing the brake pedal 23e, while the vehicle 23 is moving in straight line or making a turn, the state signal $S_{BR}$ sent from the brake switch 14 changes to indicate the activation of the brake. As a result, the control unit 20 determines at step S1 that the vehicle 23 is in the controlled state. Accordingly, the yaw rate estimating process is terminated without conducting the estimation of the yaw rate.

As described above, while the vehicle 23 is making a turn, the gain correction k is determined based on the detected lateral acceleration $Y_G$. The estimated yaw rate $\emptyset_{obs}$ is computed based on the difference between the right wheel speed and the left wheel speed $\Delta Vw$ (=$Vw_R$-$Vw_L$) and the tread T. Since the estimated yaw rate $\emptyset_{obs}$ is corrected by the gain correction k, the estimated yaw rate $\emptyset_{obs}$ can preclude the effect of an error in the wheel speed difference $\Delta Vw$ that occurs due to the tire deformation during the turn. As a result, the estimated yaw rate $\emptyset_{obs}$ can be calculated accurately.

Furthermore, the yaw rate is not estimated while the VDC controller 50 applies the brake to the wheels, or while the brake pedal is pressed. In other words, the yaw rate is estimated only when the accuracy of the estimated yaw rate $\emptyset_{obs}$ is assured. As a result, the VDC controller 50 can conduct the malfunctioning monitoring of the yaw rate sensor 51 in an appropriate manner.

Although the aforementioned embodiment utilizes the yaw rate sensor 51 for the malfunctioning monitoring with the estimated yaw rate $\emptyset_{obs}$ being estimated at the control unit 20 and outputted to the VDC controller 50, the present invention is not limited to such embodiment. More specifically, the present invention can be applied to malfunctioning monitoring of any control device that uses the yaw rate sensor for its control operation, such as a control device for a four wheel steering system.

Furthermore, although the lateral acceleration $Y_G$ is detected by the lateral acceleration sensor 13 in the described first embodiment, the lateral acceleration $Y_G$ can also be estimated based on the following equation (2) by using the detected wheel speeds $Vw_R$ and $Vw_L$ and the tread T of the vehicle 23. In other words, a lateral acceleration device is formed by a program stored in the control unit 20 and the right and left wheel speed sensors 11 and 12. In this case, the lateral acceleration $Y_G$ can be obtained even when there is no dedicated lateral acceleration sensor. Although, in the case where no dedicated lateral acceleration sensor is utilized, the accuracy of the detected lateral acceleration $Y_G$ may decrease in comparison with the case where a dedicated lateral acceleration sensor is utilized.

$$Y_{Gobs}=[(Vw_R-Vw_L)/T]\times[(Vw_R+Vw_L)/2] \qquad (2)$$

Figure 5:
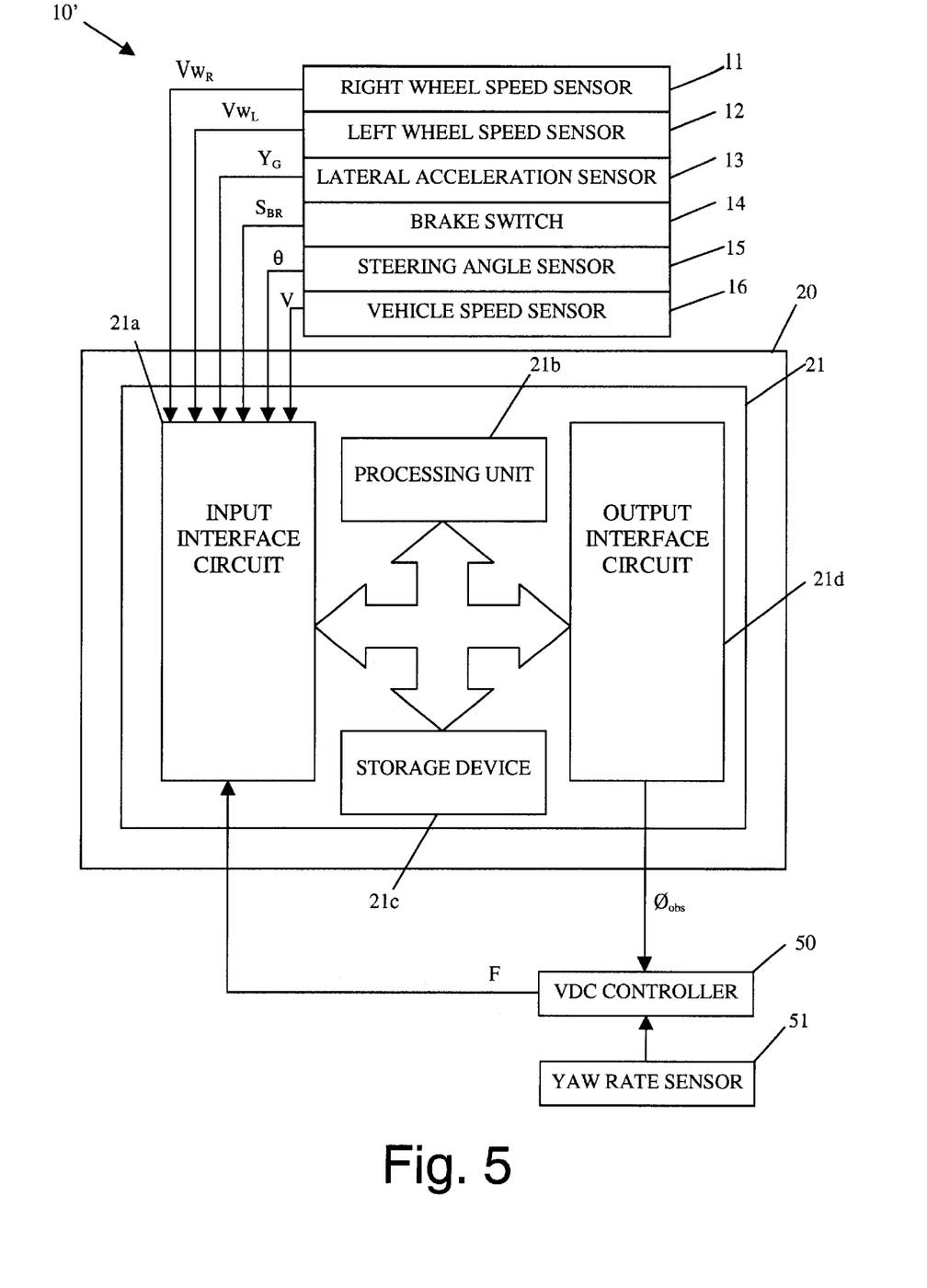
FIG. 5 is a schematic structural diagram of a yaw rate estimating apparatus and adjacent structures in accordance with a second embodiment of the present invention.

A second embodiment of the present invention will now be described in conjunction with FIGS. 5–7. FIG. 5 is a schematic structural diagram of a yaw rate estimating apparatus 10' in accordance with the second embodiment of the present invention. The yaw rate estimating apparatus 10' of the second embodiment is substantially the same as that of the first embodiment, except that the yaw rate estimating apparatus 10' of the second embodiment further includes a steering angle sensor 15 and a vehicle speed sensor 16.

The steering angle sensor 15 and the vehicle speed sensor 16 are conventional sensors that are well known in the art. Therefore, sensors 15 and 16 will not be discussed or illustrated in detail herein. Moreover, it will be apparent to those skilled in the art from this disclosure that the sensors 15 and 16 can be any type of sensors that will detect and generate the necessary signal to carry out the present invention.

One example of a steering angle sensor that can be used for steering angle sensor 15 is an optical sensor including a photo-transducer, a light emitting diode and a rotating disk with a plurality of circumferentially arranged apertures. The light emitting diode emits a light onto the rotating disk in an area of the circumferentially arranged apertures, such that the photo-transducer detects the light from the light emitting diode as it passes through the apertures of the disk. Accordingly, the phototransducer can determine the steering angle by determining the angle orientation of the rotating disk.

The vehicle speed sensor 16 can be a sensor that measures the rotation of the transmission shaft via using an electromagnetic sensor. For example, the transmission shaft includes magnets that pass a stationary switch to generate a signal that represents the rotational speed of the transmission shaft.

The steering angle sensor 15 detects a steering angle θ of a steering wheel. The vehicle speed sensor 16 detects a vehicle speed V in a forward or backward direction. The detected steering angle θ of the steering angle sensor 15 and the detected vehicle speed V of the vehicle speed sensor 16 are outputted to the control unit 20.

The control unit 20, in accordance with the second embodiment estimates the yaw rate based on the following yaw rate estimating equation (3). Furthermore, the control unit 20 can correct the estimating equation while the vehicle 23' is moving in straight line or turning.

$$\emptyset_{obs} = k \times (Vw_R - Vw_L)/T + \Delta\emptyset \quad (3)$$

Also, in the yaw rate estimating apparatus 10', the offset value of the correction amount is preferably set when the vehicle 23' is moving in straight line, so that an error in the estimated yaw rate due to, for example, a tire diameter difference between the left and right tires can be precluded.

Furthermore, in the yaw rate estimating apparatus 10', the proportional constant for correcting the estimated yaw rate is corrected when the vehicle 23' is in the steady turning state, so that the proportional constant can be advantageously set based on the current state of the vehicle 23'. As a result, the yaw rate can be estimated more accurately.

Figure 6:
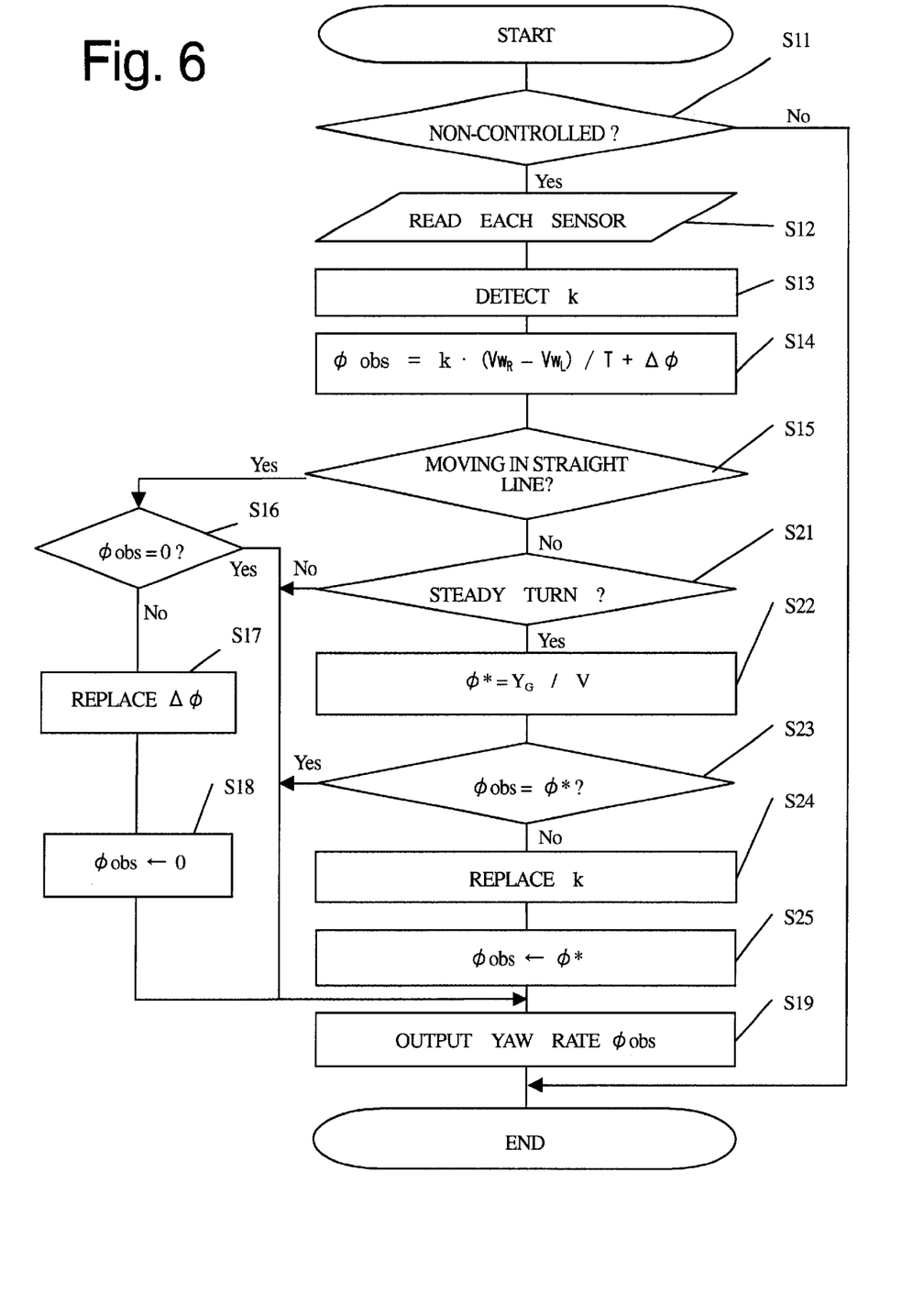
FIG. 6 is a flow chart of an operation of the yaw rate estimating apparatus in accordance with the second embodiment.
Figure 7:
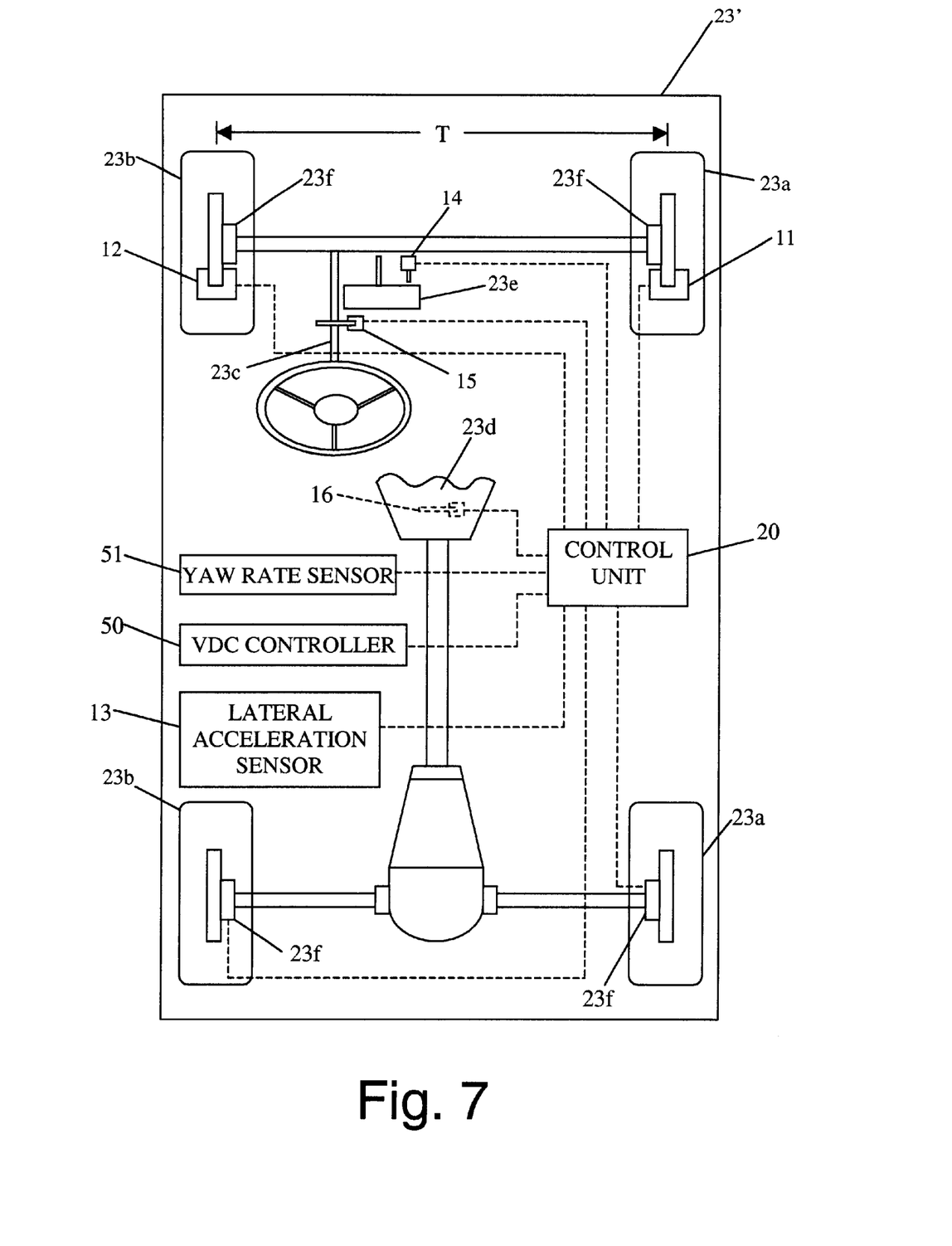
FIG. 7 is a schematic diagram of a vehicle with the yaw rate estimating apparatus in accordance with the second embodiment of the present invention.

FIG. 6 is a flow chart of a yaw rate estimating process of the control unit 20 in accordance with the second embodiment of the present invention. Similar to the first embodiment, the control unit 20 first determines whether the vehicle 23' is in non-controlled state at step S11 based on the state signal $S_{BR}$ and the signal of the VDC activation flag F. The state signal $S_{BR}$ is sent from the brake switch 14 and indicates the operational state of the brake. The signal of the VDC activation flag F is sent from the VDC controller 50. If the vehicle 23' is in the controlled state, the yaw rate estimating process is terminated.

On the other hand, if the vehicle 23' is in the non-controlled state, the control unit 20 proceeds to step S12, where it reads detected signal from each sensor 11–13 and 15–16. In other words, the control unit 20 reads the detected wheel speeds $Vw_R$ and $Vw_L$ of the right and left wheel speed sensors 11 and 12, the detected lateral acceleration $Y_G$ of the lateral acceleration sensor 13, the detected steering angle θ of the steering angle sensor 15, and the detected vehicle speed V of the vehicle speed sensor 16.

Then, the control unit 20 proceeds to step S13, where it obtains the gain correction k that corresponds to the detected lateral acceleration $Y_G$ from the gain correction characteristic map shown in FIG. 3 in a manner similar to that of the first embodiment. Then, the control unit 20 proceeds to step S14, where the yaw rate is estimated based on the equation (3). An offset value Δ∅ in the equation (3) is initially set to a predetermined value, such as zero.

The control unit 20 then proceeds to step S15, where it determines based on the detected steering angle θ of the steering angle sensor 15 whether the vehicle is moving in straight line or turning. If it is determined that the vehicle is moving in straight line, the control unit 20 proceeds to step S16, where it determines whether the estimated yaw rate $\emptyset_{obs}$ computed at step S14 based on the equation (3) is zero ($\emptyset_{obs}$=0). In other words, since the actual yaw rate is supposed to be substantially zero if the vehicle is moving in straight line, the estimated yaw rate $\emptyset_{obs}$ should also be zero ($\emptyset_{obs}$=0).

In this operation of step S16, if the estimated yaw rate $\emptyset_{obs}$ is not zero, the control unit 20 proceeds to step S17. In step S17, the control unit 20 selects a new value for the offset value Δ∅ of the equation (3) to make the estimated yaw rate $\emptyset_{obs}$ equal to zero in the equation (3). Accordingly, the estimated yaw rate $\emptyset_{obs}$ is now reset to zero in step S18. The new valve of Δ∅ will be used in subsequent calculations in step S14. Then, the control unit 20 proceeds to step S19, where this new estimated yaw rate $\emptyset_{obs}$ is outputted to the VDC controller 50.

On the other hand, if the estimated yaw rate $\emptyset_{obs}$ is zero in step S16, the control unit 20 directly proceeds to step S19.

Returning to step S15, if the vehicle 23' is not moving in straight line, the control unit 20 proceeds to step S21, where it determines based on the detected steering angle θ of the steering angle sensor 15 and the detected vehicle speed V of the vehicle speed sensor 16 whether the vehicle 23' is making a steady turn. If the vehicle 23' is not in the steady turning state, the control unit 20 proceeds to step S19. Otherwise, the control unit 20 proceeds to step S22. At step S22, the control unit 20 estimates a yaw rate ∅* of the vehicle 23' in the turning state (hereinafter referred to as steady turn yaw rate) based on following equation (4).

$$\emptyset^* = Y_G/V \quad (4)$$

Then, the control unit 20 proceeds to step S23, where it determines whether the estimated yaw rate $\emptyset_{obs}$ computed at step S14 coincides with the steady turn yaw rate Ø* computed at step S22. If the estimated yaw rate $Ø_{obs}$ coincides with the steady turn yaw rate Ø*, the control unit 20 proceeds to step S19. Otherwise, the control unit 20 proceeds to step S24, where it obtains a corresponding gain correction k', which allows the estimated yaw rate $Ø_{obs}$ of the equation (3) to coincide with the steady turn yaw rate Ø*. Then, the control unit 20 rewrites the gain correction characteristic map retrieved from the storage device 21c, such that the gain correction k that corresponds to the lateral acceleration $Y_G$ detected at step S12 is replaced with the gain correction k'. Accordingly, the subsequent calculations in step S14 will use the new gain correction characteristic map based on the new gain correction k'.

Then, the control unit 20 proceeds to step S25, where the steady turn yaw rate Ø* is set as the estimated yaw rate $Ø_{obs}$. Then, the control unit 20 proceeds to step S19, where this new estimated yaw rate $Ø_{obs}$ is outputted to the VDC controller 50.

In this second embodiment, the vehicle speed sensor 16 corresponds to the vehicle speed detecting means, while the gain correction k of the equation (3) corresponds to the proportional constant. Furthermore, the operations of steps S15 and S21 of FIG. 6 correspond to the moving state detecting means, while the operation of step S22 of FIG. 6 corresponds to the steady turn yaw rate estimating means. Also, the operation of step S24 of FIG. 6 corresponds to the proportional constant correcting means.

The details of operations of the yaw rate estimating apparatus 10' in accordance with the second embodiment will now be described. When the vehicle 23' is moving in straight line with the brake switch 14 in the released state, the control unit 20 determines that the vehicle 23' is in the non-controlled state based on the state signal $S_{BR}$ sent from the brake switch 14 and the signal of the VDC activation flag F sent from the VDC controller 50. The control unit 20 proceeds from step S11 to step S12, where the detected value of each sensor is read.

At step S13, the control unit 20 obtains a corresponding gain correction k that corresponds to the detected lateral acceleration $Y_G$ from the gain correction characteristic map shown in FIG. 3. Then, the estimated yaw rate $Ø_{obs}$ is computed based on the equation (3) using the gain correction k, the wheel speeds $Vw_R$ and $Vw_L$ detected by the left and right wheel speed sensor 11 and 12, and the tread T of the vehicle 23'. Since the vehicle 23' is moving in straight line, the control unit 20 proceeds from step S15 to step S16, where it determines whether the estimated yaw rate $Ø_{obs}$ is zero. If the vehicle 23' is moving in straight line, the actual yaw rate is supposed to be substantially zero. Therefore, the estimated yaw rate $Ø_{obs}$ should also be zero.

However, if the tires on the left and right wheels have different diameters, or if the left and right tires wear differently and therefore have different diameters, the estimated yaw rate $Ø_{obs}$ cannot be zero. In this case, the control unit 20 proceeds from step S16 to step S17, where the offset value ΔØ of the equation (3) is reset such that the estimated yaw rate $Ø_{obs}$ becomes zero, thereby resetting or writing the equation (3). In other words, the offset value ΔØ is set to such value that allows the estimated yaw rate $Ø_{obs}$ to be free from an error due to the tires having different diameters. Accordingly, subsequent calculations of the equation (3) will use the new or reset ΔØ.

Next, the control unit 20 proceeds to step S18, where the estimated yaw rate $Ø_{obs}$ is set to zero. Then, the control unit 20 proceeds to step S19, where this new estimated yaw rate $Ø_{obs}$ is outputted to the VDC controller 50. The VDC controller 50 compares this estimated yaw rate $Ø_{obs}$ with a detected yaw rate of the yaw rate sensor 51 to monitor malfunctioning of the yaw rate sensor 51.

In other words, the offset value ΔØ is set based on the current tire conditions. Therefore, the yaw rate estimating equation (3) takes into consideration the tire conditions at the time of estimation. Therefore, the yaw rate estimating process can compute the estimated yaw rate $Ø_{obs}$ free of errors due to the tires having different diameters. As a result, more accurate yaw rate estimation can be achieved.

If the vehicle 23' is making a turn, the control unit 20 proceeds from step S15 to step S21. If this turn is a steady turn, the control unit 20 proceeds from step S21 to step S22, where the steady turn yaw rate Ø* is estimated based on the detected lateral acceleration $Y_G$ and the detected vehicle speed V. Then at step S23, the control unit 20 determines whether the steady turn yaw rate Ø* is equal to the estimated yaw rate $Ø_{obs}$. If the vehicle 23' is in the steady turning state, the steady turn yaw rate generated on the vehicle 23' can be estimated based on the equation (4). If the steady turn yaw rate Ø* does not coincide with the estimated yaw rate $Ø_{obs}$, the control unit 20 proceeds from step S23 to step S24, where it computes a corresponding gain correction k', which makes the estimated yaw rate $Ø_{obs}$ equal to the steady turn yaw rate Ø*. Assuming that the detected lateral acceleration read at step S12 is $Y_G'$, the gain correction k that corresponds to the detected lateral acceleration $Y_G'$ in the gain correction characteristic map is replaced with the computed corresponding gain correction k'.

At step S25, the steady turn yaw rate Ø* computed at step S22 is set as the estimated yaw rate $Ø_{obs}$ At step S19, the control unit 20 outputs this new estimated yaw rate $Ø_{obs}$ to the VDC controller 50.

Thereafter, when the detected lateral acceleration is equal to $Y_G'$, the renewed gain correction k' is used as the gain correction corresponding with the detected lateral acceleration $Y_G'$. Accordingly, subsequent yaw rate estimations are made based on this renewed or reset gain correction k'. Since the gain correction k' takes into consideration the current state of the vehicle 23', appropriate correction can be made so as to suit the current state of the vehicle 23' by using the gain correction k'. Consequently, the yaw rate estimating apparatus 10' can estimate yaw rate with more accuracy.

When the vehicle 23' gets out of the steady turning state, by steering the vehicle 23' and/or by accelerating the vehicle 23', the control unit 20 proceeds from step S21 to step S19. Accordingly, resetting of the gain correction k ceases.

Furthermore, when the driver depressed the brake pedal, or when the VDC controller 50 takes control of the wheels, this change in the situation is detected at step S11. Accordingly, the estimation of the yaw rate ceases.

In the aforementioned second embodiment, the offset value ΔØ in the yaw rate estimating equation (3) is reset when the vehicle 23' is moving in straight line. As a result, even if the tires of the vehicle 23' have different diameters, or even if the tires wear differently or lose its air pressure differently, an error in the estimated yaw rate $\emptyset_{obs}$ due to the fact that the left and right tires have different tire diameters can be eliminated. As a result, the yaw rate can be estimated with more accuracy.

Furthermore, the gain correction k is corrected when the vehicle 23' is in the steady turning state. Therefore, the gain correction k can be set so as to suit the state of the vehicle 23' at the time. Accordingly, the yaw rate can be estimated with more accuracy in both steady turing state and transitional turning state.

Also, it should be understood that the second embodiment achieves similar advantages to those of the first embodiment. As in the first embodiment, the present invention can be applied to malfunctioning monitoring of any control device that uses the yaw rate sensor for its control operation, such as a control device for a four wheel steering system. Also, the lateral acceleration $Y_G$ can also be estimated based on the equation (2) using the detected wheel speeds $Vw_R$ and $Vw_L$ and the tread T of the vehicle 23'.

Furthermore, although the detected vehicle speed V is obtained from the vehicle speed sensor 16 in the described second embodiment, the vehicle speed can also be obtained by any other appropriate way. For example, the vehicle speed can be computed based on the detected right and left wheel speeds $Vw_R$ and $Vw_L$.

This application claims priority to Japanese Application No. H11-084319. The entire disclosure of Japanese Application No. H11-084319 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A yaw rate estimating apparatus for a vehicle having a right wheel and a left wheel, said yaw rate estimating apparatus comprising:
   a right wheel speed sensor that detects a right wheel speed of said right wheel and generates a right wheel speed signal;
   a left wheel speed sensor that detects a left wheel speed of said left wheel and generates a left wheel speed signal;
   a vehicle status detector that indicates a current state of a selected parameter of said vehicle;
   a lateral acceleration sensor that detects a lateral acceleration of said vehicle and generates a lateral acceleration signal; and
   a control unit operatively coupled to said vehicle status indicator and said right and left wheel speed sensors to initially estimate a yaw rate of said vehicle based on a difference between said right wheel speed and said left wheel speed from said right and left wheel speed signals in response to said control unit determining said vehicle is a non-controlled state from said vehicle status indicator, said control unit correcting said estimate of said yaw rate based on said lateral acceleration signal to determine and output an estimated yaw rate.

2. The yaw rate estimating apparatus according to claim 1, wherein said vehicle status indicator includes a brake switch that generates a brake signal when a brake pedal for actuating a brake of the vehicle is depressed by a driver, such that said control unit determines that the vehicle is in said non-controlled state.

3. The yaw rate estimating apparatus according to claim 1, wherein said vehicle status indicator includes a controller that generates a signal that is received by said control unit to determine whether said vehicle is in said non-controlled state.

4. The yaw rate estimating apparatus according to claim 1, wherein
   said control unit includes a gain correction characteristic map with a predetermined gain correction that is based on said lateral acceleration determined by said lateral acceleration device to correct said estimated yaw rate.

5. The yaw rate estimating apparatus according to claim 4, wherein
   said gain correction is based on a proportional constant that is predetermined for said lateral acceleration.

6. The yaw rate estimating apparatus according to claim 1, wherein
   said lateral acceleration sensor is configured to compute said lateral acceleration by multiplying said difference between said right wheel speed and said left wheel speed with an average of said right wheel speed and said left wheel speed.

7. The yaw rate estimating apparatus according to claim 1, further including
   a steering angle sensor that detects a steering angle of said vehicle and generates a steering angle signal that is received by said control unit to determine a moving state of said vehicle, said control unit being configured with a predetermined correction amount used in determining said estimated yaw rate based on said moving state of said vehicle detected by said steering angle sensor.

8. The yaw rate estimating apparatus according to claim 7, wherein
   said control unit is configured to determine an offset value for said predetermined correction amount to make said estimated yaw rate equal to zero if said vehicle is moving in straight line as detected by said steering angle sensor, said predetermined correction amount being replaced with a new predetermined correction amount based on said offset value.

9. The yaw rate estimating apparatus according to claim 7, further including
   a predetermined gain correction stored in said control unit, said predetermined gain correction being based on a proportional constant that is predetermined for said lateral acceleration determined by said lateral acceleration device to correct said estimated yaw; and
   a vehicle speed sensor that detects a vehicle speed and generates a vehicle speed signal that is received by said control unit, said control unit being configured to determine based on said steering angle and said vehicle speed whether said vehicle is in a steady turn state, and said control unit being configured to replace said proportional constant of said gain correction by setting said estimated yaw rate as a steady turn yaw rate if said vehicle is in said steady turn state, said steady turn yaw rate being equal to said lateral acceleration divided by said vehicle speed.

10. A yaw rate estimating apparatus for a vehicle having a right wheel and a left wheel, said yaw rate estimating apparatus comprising:

right wheel speed detecting means for detecting a right wheel speed of said right wheel;

left wheel speed detecting means for detecting a left wheel speed of said left wheel;

non-controlled state detecting means for detecting whether said vehicle is in a non-controlled state;

lateral acceleration obtaining means for obtaining a lateral acceleration generated on said vehicle;

yaw rate estimating means for computing an estimated yaw rate of said vehicle based on a difference between said right wheel speed and said left wheel speed if said vehicle is in said non-controlled state; and correcting means for correcting said estimated yaw rate based on said lateral acceleration to output a corrected estimated yaw rate.

11. The yaw rate estimating apparatus according to claim 10, wherein said non-controlled state detecting means includes a brake switch and a controller to be operatively coupled to said yaw estimating means to determine whether said vehicle is in said non-controlled state.

12. The yaw rate estimating apparatus according to claim 10, wherein said correcting means includes a moving state detecting means that detects a moving state of said vehicle, said correcting means being configured with a predetermined correction amount used in determining said estimated yaw rate based on said moving state of said vehicle.

13. The yaw rate estimating apparatus according to claim 12, wherein said correcting means is configured to determine an offset value for said predetermined correction amount to make said estimated yaw rate equal to zero if said vehicle is moving in straight line as detected by said moving state detecting means.

14. The yaw rate estimating apparatus according to claim 13, wherein said correcting means includes a predetermined gain correction, said predetermined gain correction being based on a proportional constant that is predetermined for said lateral acceleration obtaining means to correct said estimated yaw; and vehicle speed sensing means for detecting a vehicle speed, said vehicle speed sensing means being operatively coupled to said moving state detecting means to detect said moving state of said vehicle, said control unit being configured to replace said proportional constant of said gain correction by setting said estimated yaw rate as a steady turn yaw rate if said vehicle is in a steady turn state, said steady turn yaw rate being equal to said lateral acceleration divided by said vehicle speed.

15. The yaw rate estimating apparatus according to claim 12, wherein said correcting means includes a predetermined gain correction, said predetermined gain correction being based on a proportional constant that is predetermined for said lateral acceleration obtaining means to correct said estimated yaw; and vehicle speed sensing means for detecting a vehicle speed, said vehicle speed sensing means being operatively coupled to said moving state detecting means to detect said moving state of said vehicle, said control unit being configured to replace said proportional constant of said gain correction by setting said estimated yaw rate as a steady turn yaw rate if said vehicle is in a steady turn state, said steady turn yaw rate being equal to said lateral acceleration divided by said vehicle speed.

16. A method of estimating a yaw rate of a vehicle having a right wheel and left wheel, said method comprising:

providing a right wheel speed sensor and a left wheel speed sensor;

determining whether said vehicle is in a non-controlled state;

detecting a right wheel speed of said right wheel through said right wheel speed sensor;

detecting a left wheel speed of said left wheel through said a left wheel speed sensor;

obtaining a lateral acceleration of said vehicle;

computing an initial estimation of a yaw rate of said vehicle based on a difference between said right wheel speed and said left wheel speed if said vehicle is in said non-controlled state; and correcting said initial estimation of said yaw rate based on said lateral acceleration to determine an estimated yaw rate.

17. The method of estimating a yaw rate according to claim 16, further comprising providing a brake switch for sending a brake signal and a VDC controller for sending an activation signal to determine whether said vehicle is in said non-controlled state based on said brake signal and said activation signal.

18. The method of estimating a yaw rate according to claim 16, further comprising providing a gain correction characteristic map with a predetermined gain correction that is based on a proportional constant that is predetermined for said lateral acceleration, said estimate yaw rate being determined by obtaining a gain correction that corresponds to said lateral acceleration and multiplying said estimation of said yaw rate by said gain correction.

19. The method of estimating a yaw rate according to claim 16, wherein said lateral acceleration is obtained by a lateral acceleration sensor.

20. The method of estimating a yaw rate according to claim 16, wherein said lateral acceleration is computed based on said right wheel speed and said left wheel speed.

21. The method of estimating a yaw rate according to claim 16, further comprising providing a predetermined correction amount to be used in determining said estimated yaw rate based on a moving state of said vehicle;

providing a steering angle sensor for detecting a steering angle of said vehicle, and a vehicle speed sensor for detecting a vehicle speed;

determining based on said steering angle whether said vehicle is moving in straight line; and determining an offset value for said predetermined correction amount to make said estimated yaw rate equal to zero if said vehicle is moving in straight line as detected by said steering angle sensor, said predetermined correction amount being replaced with a new predetermined correction amount based on said offset value.

22. The method of estimating a yaw rate according to claim 18, further comprising providing a predetermined correction amount to be used in determining said estimated yaw rate based on a moving state of said vehicle;

providing a steering angle sensor for detecting a steering angle of said vehicle, and a vehicle speed sensor for detecting a vehicle speed;

determining based on said steering angle whether said vehicle is moving in straight line; and determining an offset value for said predetermined correction amount to make said estimated yaw rate equal to zero if said vehicle is moving in straight line as detected by said steering angle sensor, said predetermined correction amount being replaced with a new predetermined correction amount based on said offset value.

23. The method of estimating a yaw rate according to claim 22, further comprising determining based on said steering angle and said vehicle speed whether said vehicle is making a steady turn; and replacing said gain correction by setting said estimated yaw rate as a steady turn yaw rate when said vehicle is making a steady turn, said steady turn yaw rate being said lateral acceleration divided by said vehicle speed.

* * * * *